United States Patent
Hofmann et al.

(10) Patent No.: US 12,438,481 B2
(45) Date of Patent: Oct. 7, 2025

(54) MODULAR BRAKING ADJUSTER WITH HYBRID DESIGN

(71) Applicant: Innomotics GmbH, Nuremberg (DE)

(72) Inventors: Viktor Hofmann, Bayreuth (DE); Patrick Hofstetter, Erlangen (DE)

(73) Assignee: Innomotics GmbH, Nuremberg (DE)

( * ) Notice: Subject to any disclaimer, the term of this patent is extended or adjusted under 35 U.S.C. 154(b) by 0 days.

(21) Appl. No.: 19/099,703

(22) PCT Filed: Jul. 3, 2023

(86) PCT No.: PCT/EP2023/068141
§ 371 (c)(1),
(2) Date: Jan. 29, 2025

(87) PCT Pub. No.: WO2024/041786
PCT Pub. Date: Feb. 29, 2024

(65) Prior Publication Data
US 2025/0260345 A1  Aug. 14, 2025

(30) Foreign Application Priority Data
Aug. 22, 2022  (EP) .................................... 22191487

(51) Int. Cl.
*H02P 3/22* (2006.01)
*H02P 27/06* (2006.01)

(52) U.S. Cl.
CPC ................ *H02P 3/22* (2013.01); *H02P 27/06* (2013.01)

(58) Field of Classification Search
CPC .................................. H02P 3/22; H02P 27/06
See application file for complete search history.

(56) References Cited

U.S. PATENT DOCUMENTS 10,298,155 B2 * 5/2019 Lee .......................... H02P 29/68
10,873,266 B2 * 12/2020 Stark ........................ H02M 1/08
(Continued)

FOREIGN PATENT DOCUMENTS

| CN | 107 834 868 A | 3/2018 |
| CN | 109 787 264 A | 5/2019 |

(Continued)

OTHER PUBLICATIONS

Adam G. P. et al: "Mixed calls modular multilevel converter", 2014 IEEE 23rd International Symposium On Industrial Electronics (ISIE), IEEE, Jun. 1, 2014 (Jun. 1, 2014), pp. 1390-1395, XP032623960, DOI: 10.1109/ISIE.2014.8864817.
(Continued)

*Primary Examiner* — Thai T Dinh
(74) *Attorney, Agent, or Firm* — Henry M. Feiereisen LLC (57) ABSTRACT

A modular braking adjuster includes a brake resistor and at least two sub-modules arranged in series. At least one sub-module is constructed as a full-bridge module and at least one sub-module is constructed as a double half-bridge module. A control device is configured to generate a voltage across the serially connected sub-modules, wherein the voltage has a direct voltage component and an alternating voltage component. The control device provides open-loop or closed-loop control of the alternating voltage component, such that the alternating voltage component is at least temporarily greater than the direct voltage component and the time-averaged energy taken up by the modular braking adjuster is converted into heat in the brake resistor. An electric drive having the modular braking adjuster and a power converter electrically connected on the direct voltage side to the modular braking adjuster and a method for operating a modular braking adjuster are also disclosed.

10 Claims, 4 Drawing Sheets

(56) References Cited

U.S. PATENT DOCUMENTS

| | | | |
|---|---|---|---|
| 11,750,139 B2* | 9/2023 | Halder | H02P 29/68 318/273 |
| 2020/0201953 A1 | 6/2020 | Shi et al. | |

FOREIGN PATENT DOCUMENTS

| | | |
|---|---|---|
| DE | 10 103 031 A1 | 7/2002 |
| EP | 2 777 127 A1 | 9/2014 |
| EP | 2 834 896 B1 | 5/2016 |
| WO | WO 2007/023061 A2 | 3/2007 |
| WO | WO 2014/086428 A1 | 8/2014 |

OTHER PUBLICATIONS

Cao Shuai et al: "AC and DC fault ride through hybrid MMC integrating wind power". The Journal of Engineering, The Institution of Engineering and Technology, Michael Faraday House, Six Hills Way, Stevenage, Herts, SGI 2AY, UK, Bd. 2017, Nr. 13, Jan. 1, 2017 (Jan. 1, 2017). pp. 828-833, XP006065959, DOI: 10.1049/JOE.2017.0446.

Adam Grain Philip et al: "New Efficient Submodule for a Modular Multilevel Converter in Multiterminal HVDC Networks", IEEE Transactions On Power Electronics, Institute of Electrical and Electronics Engineers, USA, Bd. 32, Nr. 6, Jun. 1, 2017 (Jun. 1, 2017), pp. 4258-4278, XP011640302, ISSN: 0885-8993, DOI: 10.1109/TPEL.2016.2603180.

Wei Yingdong et al: "Real-Time Simulation of Hybrid Modular Multilevel Converters Using Shifted Phasor Models", IEEE Access, Bd. 7, 7. Jan. 2019 (2019-01-07), pp. 2376-2388, XP011695821, Doi: 10.1109/ACCESS.2018.2884506;.

PCT International Search Report and Written Opinion of International Searching Authority mailed on Oct. 10, 2023, corresponding to PCT International Application No. PCT/EP2023/068141 filed on Jul. 3, 2023.

* cited by examiner

MODULAR BRAKING ADJUSTER WITH HYBRID DESIGN

CROSS-REFERENCES TO RELATED APPLICATIONS

This application is the U.S. National Stage of International Application No. PCT/EP2023/068141, filed Jul. 3, 2023, which designated the United States and has been published as International Publication No. WO 2024/041786 A1 and which claims the priority of European Patent Application, Serial No. 22191487.2, filed Aug. 22, 2022, pursuant to 35 U.S.C. 119(a)-(d).

BACKGROUND OF THE INVENTION

The invention relates to a modular braking adjuster, having a brake resistor and at least two submodules, wherein the brake resistor and the submodules are arranged in a series circuit. The invention further relates to an electric drive, having a modular braking adjuster of this kind and a power converter, wherein the power converter is electrically connected on the direct voltage side to the modular braking adjuster. The invention further relates to a method for operating a modular braking adjuster of this kind or an electric drive of this kind.

A modular multilevel power converter is known from DE 10 103 031 A1. This power converter, also known as M2C or MMC, has a converter topology that, due to its design with submodules, is in particular suitable for medium-voltage and high-voltage applications. The basic design of the multi-phase converter comprises two converter arms per phase, which in each case have a series circuit of submodules. Herein, the two converter arms are connected to one another at the phase terminal. The other side of the converter arms is connected to the direct voltage side. The alternating voltage side of the modular multilevel power converter is formed by one or more phase terminals. In the basic design, the converter can be used to transfer energy bidirectionally between the direct voltage side and the alternating voltage side or to store it temporarily to a certain extent.

In order to additionally enable targeted energy reduction, it is advisable to install a braking adjuster. A modular braking adjuster is known from WO 2007/023061 A2. The modular braking adjuster is usually connected to the direct voltage side of the modular multilevel power converter, for example between a DC+ terminal and a DC- terminal.

The resistor in a braking adjuster arrangement is often also referred to as a brake resistor, as it is suitable for converting electrical energy from an electric machine, which is generated as a result of a braking process, into heat. Herein, the use of a braking adjuster is not restricted to the application of a braking electric drive. For example, it does not necessarily have to be braking energy that is converted into heat. The braking adjuster can, for example, also be used to stabilize a power supply network by converting electrical energy from the energy supply network into heat. The term brake resistor was selected to distinguish a resistor in which a given electrical energy or power is converted into heat or heat per unit of time from other resistors.

Hereinafter, the term "power to be converted into heat" means that the integral of power over time is converted into heat. In other words, a quantity of energy accumulated from the power over time is converted into heat.

The invention is based on the object of improving a modular braking adjuster.

SUMMARY OF THE INVENTION

This object is achieved by a modular braking adjuster, wherein the modular braking adjuster has a brake resistor and at least two submodules, wherein the brake resistor and the submodules are arranged in a series circuit, wherein at least one submodule is embodied as a full-bridge module and at least one submodule is embodied as a double half-bridge module, wherein the modular braking adjuster has a control device, which is configured to generate a voltage across the submodules arranged in series, wherein the voltage comprises a direct voltage component and an alternating voltage component, wherein the control device is further configured to provide open-loop or closed-loop control of the alternating voltage component, in particular in respect of its amplitude, in such a way that the energy taken up by the modular braking adjuster on average over time is converted into heat in the brake resistor, wherein, at least temporarily, the amplitude of the alternating voltage component is greater than the direct voltage component. This object is further achieved by an electric drive, wherein the electric drive has a modular braking adjuster of this kind and a power converter, wherein the power converter is electrically connected on the direct voltage side to the modular braking adjuster. This object is further achieved by a method for operating a modular braking adjuster of this kind or an electric drive of this kind, wherein the submodules generate a voltage across the submodules arranged in series, which, at least temporarily, comprise a negative and a positive voltage range, wherein the voltage comprises a direct voltage component and an alternating voltage component, wherein the alternating voltage component is subjected to open-loop control or closed-loop control in such a way that the energy taken up by the modular braking adjuster is converted into heat in the brake resistor, wherein the amplitude of the alternating voltage component is, at least temporarily, greater than the direct voltage component.

Further advantageous embodiments of the invention are disclosed in the dependent claims.

The invention is inter alia based on the finding that the combination of at least one full-bridge module and one double half-bridge module allows a negative voltage to be applied across the series circuit of submodules. This negative voltage is directed in such a way that the voltage applied to the brake resistor is greater than the DC link voltage applied to the terminals of the modular braking adjuster. Increasing the voltage at the brake resistor enables a higher power to be converted into heat by the modular braking adjuster. Herein, the heat corresponds to the power integrated over time.

The brake resistor can be arranged anywhere in the series circuit. For example, the brake resistor can be arranged between one of the terminals of the modular braking adjuster and a submodule or anywhere between two submodules. The brake resistor can also be the sum of a plurality of partial resistors arranged in series. The partial resistors, which can be arranged at different positions in the series circuit, work together as a brake resistor in the series circuit.

The number of submodules enables the modular braking adjuster to be adapted to the DC link voltage of a power converter in such a way that it can be connected to any power converter, in particular to a modular multilevel power converter. For scaling to higher voltages and for operation at different operating points, any number of full-bridge modules, half-bridge modules and resistors can be arranged or connected in series in any order.

The semiconductor switches arranged in the submodules enable different voltages to be generated at the terminals of the respective submodules. With a full-bridge module, it is also possible for voltages with different signs (+/−) to be generated. With the double half-bridge module, four defined switching states can be generated in active mode: zero voltage, first capacitor voltage, second capacitor voltage or the sum of the first and second capacitor voltage. With the full-bridge module, it is also possible to achieve four switching states, wherein two of these switching states lead to zero voltage at the terminals of the switching module. In addition, the positive and the negative capacitor voltage can be generated at the terminals of the submodule. The aforementioned switching states of the double half-bridge module and full-bridge module are independent of the flow direction of the current through the corresponding submodule. IGBT modules with an antiparallel diode are often used as semiconductor switches for medium-voltage and high-voltage applications.

A consideration of the switching states reveals that the use of a double half-bridge module enables the voltage range of the modular braking adjuster to be approximately doubled compared to the full-bridge module, since the voltages at the two capacitors add up to an output voltage in one of the switching states of the double half-bridge module.

The current through the brake resistor is subjected to open-loop or closed-loop control using the voltage across the series circuit of the submodules. The current has a direct component and an alternating component. The alternating component has a periodic curve and an average value of zero. The direct component provides open-loop or closed-loop control of the power to be converted into heat by the modular braking adjuster, while the alternating component maintains energy balance in the submodules, thus stabilizing the operation of the modular braking adjuster. Herein, the level of the alternating component of the voltage across the series circuit of the submodules and current through the modular braking adjuster depends inter alia on the resistance value of the brake resistor. The use of full-bridge modules also enables a negative voltage to be generated across the series circuit of the submodules. This also allows operation to be realized in which the amplitude of the alternating component exceeds the direct component. For a given resistance, this increases the power range of the modular braking adjuster. The more full-bridge modules are used, the greater the amount of negative voltage generated across the series circuit of the submodules.

A hybrid design of the modular braking adjuster in which the number of full-bridge modules results from the requirement for the amount of negative voltage across the series circuit of the submodules to generate a correspondingly high current through the modular braking adjuster has therefore proven to be particularly positive. At the same time, the use of double bridge modules achieves a high operating voltage for the modular braking adjuster. Both types of submodule, i.e., the full-bridge module and the double half-bridge module, take up almost the same installation space due to the same number of semiconductors and the associated trigger circuit. This means that a mechanical framework for accommodating submodules of a modular braking adjuster can be easily filled with double half-bridge modules and full-bridge modules. The corresponding mounting positions for the submodules can be embodied with the same design and are therefore suitable for accommodating both a double half-bridge module and a full-bridge module. This is a particularly advantageous way of constructing a modular braking adjuster with high performance and high operating voltage in a modular and therefore simple and cost-effective manner. Likewise, the same trigger circuit can be used to trigger a double half-bridge module and a full-bridge module, since both types of module have the same number of semiconductor switches (4 semiconductor switches). Thus, the hybrid design of the modular braking adjuster is particularly easy and inexpensive to manufacture and covers a wide range for performance and operating voltage.

The modular braking adjuster is usually advantageously operated in combination with a power converter. Herein, the modular braking adjuster is part of a drive system in which non-regenerative energy, for example from an electric machine, is converted into heat during a braking process. In contrast to braking with a mechanical brake, this process is wear-free.

In the method according to the invention, wherein the submodules generate a voltage across the submodules arranged in series which, at least temporarily, comprise a negative voltage range and a positive voltage range, a negative voltage is generated, at least temporarily, by the submodules across the submodules arranged in series. This is done in order to generate a current through the modular braking adjuster that is greater than a current that could be generated when the DC link voltage of the electric drive or the operating voltage of the modular braking adjuster is applied across the brake resistor.

In an advantageous embodiment of the invention, at least one of the submodules, in particular all of the submodules, in each case has a bypass switch, which is configured to short-circuit the terminals of the respective submodule. In order to be able to maintain operation even if a submodule fails, it has proven to be advantageous to create redundancy. Herein, not all of the submodules contribute to generating the DC link voltage across the series circuit of the submodules. If a submodule fails, the corresponding submodule can be bypassed by means of the bypass switch and thus does not interfere with the operation of the modular braking adjuster.

In a further advantageous embodiment of the invention, the power converter is embodied as a modular multilevel power converter. It is particularly advantageous to combine the modular braking adjuster with the modular multilevel power converter, also referred to as an M2C power converter, to form an electric drive. Herein, identical submodules can be used for both the modular multilevel power converter and the modular braking adjuster. Herein, the modular multilevel power converter can be constructed from double half-bridge modules, full-bridge modules or a combination of these two submodule types. Likewise, the same hardware can be used to control the submodules. The modular design of both the power converter and the modular braking adjuster enables the electric drive to be easily adapted to the required performance by selecting an appropriate number of submodules in the power converter and in the modular braking adjuster. The identical design of the submodules in the modular braking adjuster and multilevel power converter enables a high proportion of identical parts to be achieved. This has a positive impact on the reliability and manufacturing costs of a drive unit of this kind.

The modular braking adjuster can be connected to the direct voltage side of any design of power converters and is not restricted to use with a modular multilevel power converter.

BRIEF DESCRIPTION OF THE DRAWING

The invention is described and explained in detail below with reference to the exemplary embodiments depicted in the figures, which show.

DETAILED DESCRIPTION OF PREFERRED EMBODIMENTS

Figure 1:
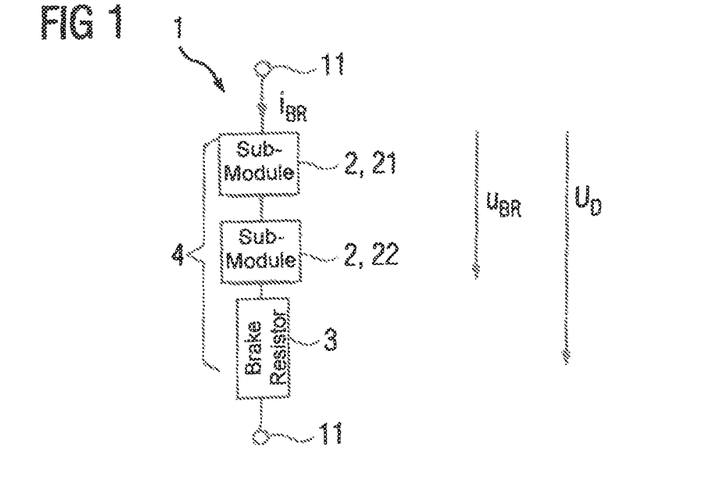
FIG. 1 and FIG. 2 exemplary embodiments of the modular braking adjuster.
Figure 2:
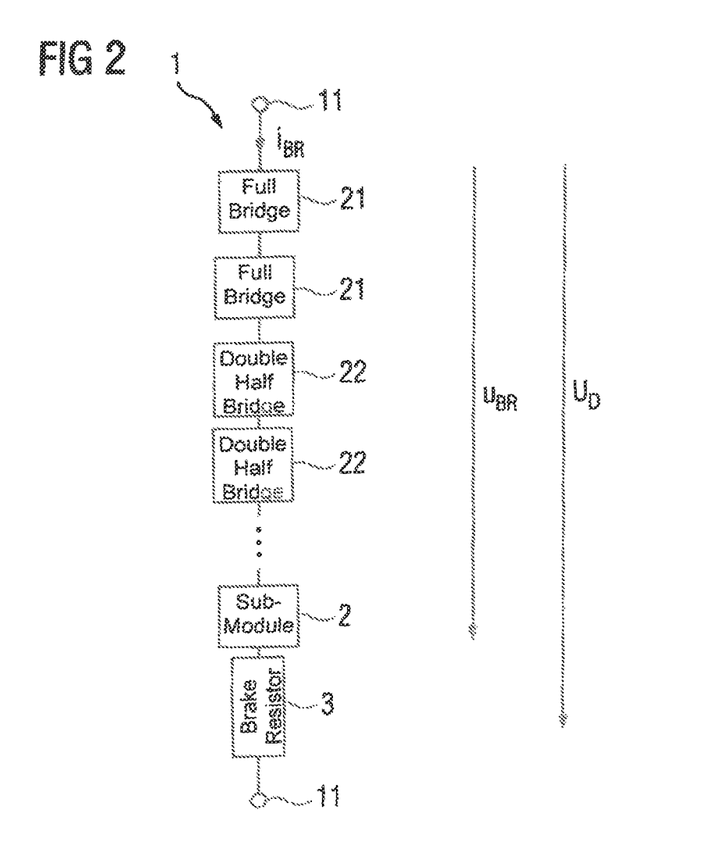

FIG. 1 shows a modular braking adjuster 1. This has a series circuit 4 of at least two submodules 2 and a brake resistor 3. Herein, the series circuit 4 also comprises a series circuit of the submodules 2. With respect to the submodules 2, at least one submodule 2 is embodied as a full-bridge module 21 and one submodule 2 is embodied as a double half-bridge module 22. The modular braking adjuster can also have a plurality of submodules 2, as shown in FIG. 2. Herein, the submodules 2 can be full-bridge modules 21 and double half-bridge modules 22. However, the use of all other known submodules 2 is also possible. The modular braking adjuster 1 is configured to be connected at its terminals 11 to a DC link 9 of a power converter 5, 51.

A voltage $u_{BR}$ can be generated across the series circuit of the submodules 2. The voltage $u_{BR}$ enables a current $i_{BR}$ to be generated through the modular braking adjuster 1. The current through the brake resistor 3 causes the electrical energy to be converted into heat. The operating voltage Up is applied across the modular braking adjuster 1. If the modular braking adjuster 1 is connected to the DC link of a power converter, the DC link voltage is applied to the modular braking adjuster. In this case, the modular braking adjuster 1 is said to be connected to the direct voltage side of the power converter.

Figure 3:
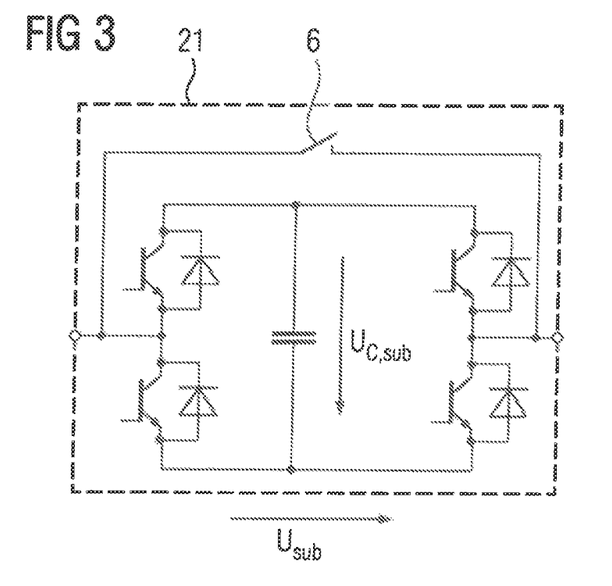
FIG. 3 a submodule as a full-bridge module.
Figure 4:
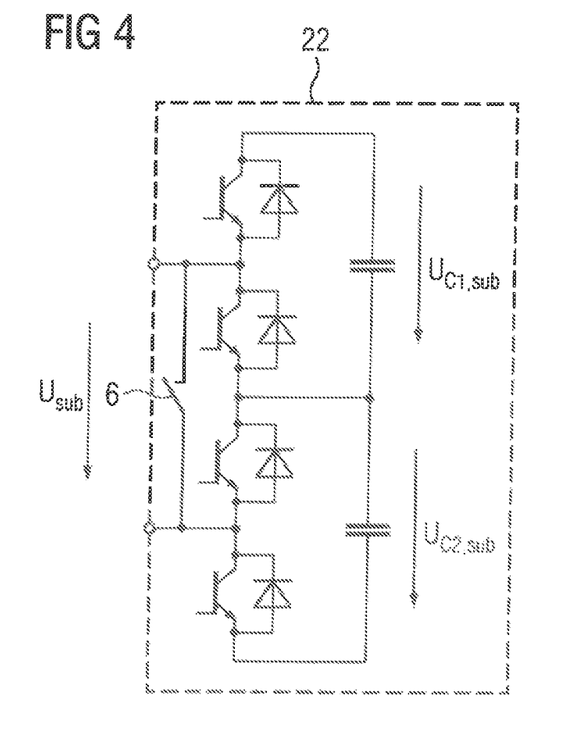
FIG. 4 a submodule as a double half-bridge module.

FIGS. 3 and 4 show exemplary embodiments of submodules 2. Herein, FIG. 3 shows a full-bridge module 21 and FIG. 4 a double half-bridge module. These are part of the proposed design. In addition, the modular braking adjuster 1 can be extended with submodules 2 that are already known. To avoid repetition, reference is made to the description of FIGS. 1 and 2 and to the reference symbols introduced there.

The depicted exemplary embodiments of the submodules 2, 21, 22 comprise four semiconductor switches and at least one capacitor. Switching the semiconductor switches enables an output voltage $U_{sub}$ to be generated at the terminals of submodule 2. Herein, a trigger circuit transmits the trigger signals to the semiconductor switches of submodule 2. A bypass switch 6 can optionally be provided in submodule 2 to bypass the corresponding submodule 2.

FIG. 3 shows a so-called full-bridge module. This has four semiconductor switches and a capacitor. The voltage $U_{C,sub}$ is applied to the capacitor. By switching operations of the semiconductor switches, the output voltage $U_{sub}$ at the terminals 11 of submodule 2 can be generated as zero, the positive or negative capacitor voltage $\pm U_{C,sub}$.

FIG. 4 shows a so-called double bridge module. This has four semiconductor switches and two capacitors. The voltage $U_{C1,sub}$ or $U_{C2,sub}$ is applied to the capacitors in each case. By switching operations of the semiconductor switches, the output voltage $U_{sub}$ at the terminals 11 of submodule 2 can be generated as zero, one of the capacitor voltages $U_{C1,sub}$, $U_{C2,sub}$, or the sum of the capacitor voltages $U_{C1,sub}$, $U_{C2,sub}$.

Figure 5:
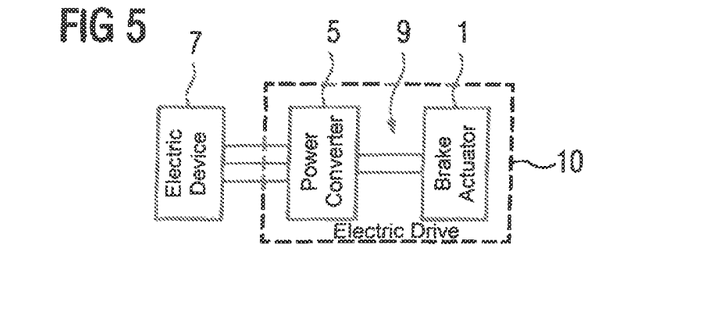
FIG. 5 and FIG. 6 exemplary embodiments of proposed electric drives.

FIG. 5 depicts an exemplary embodiment of an electric drive 10. Herein, an electric device 7 is electrically connected to the alternating voltage side of a power converter 5. The modular braking adjuster 1 is connected to the direct voltage side of the power converter 5 via the DC link 9. The electric device 7 can, for example, be a power supply network or an electric machine.

Figure 6:
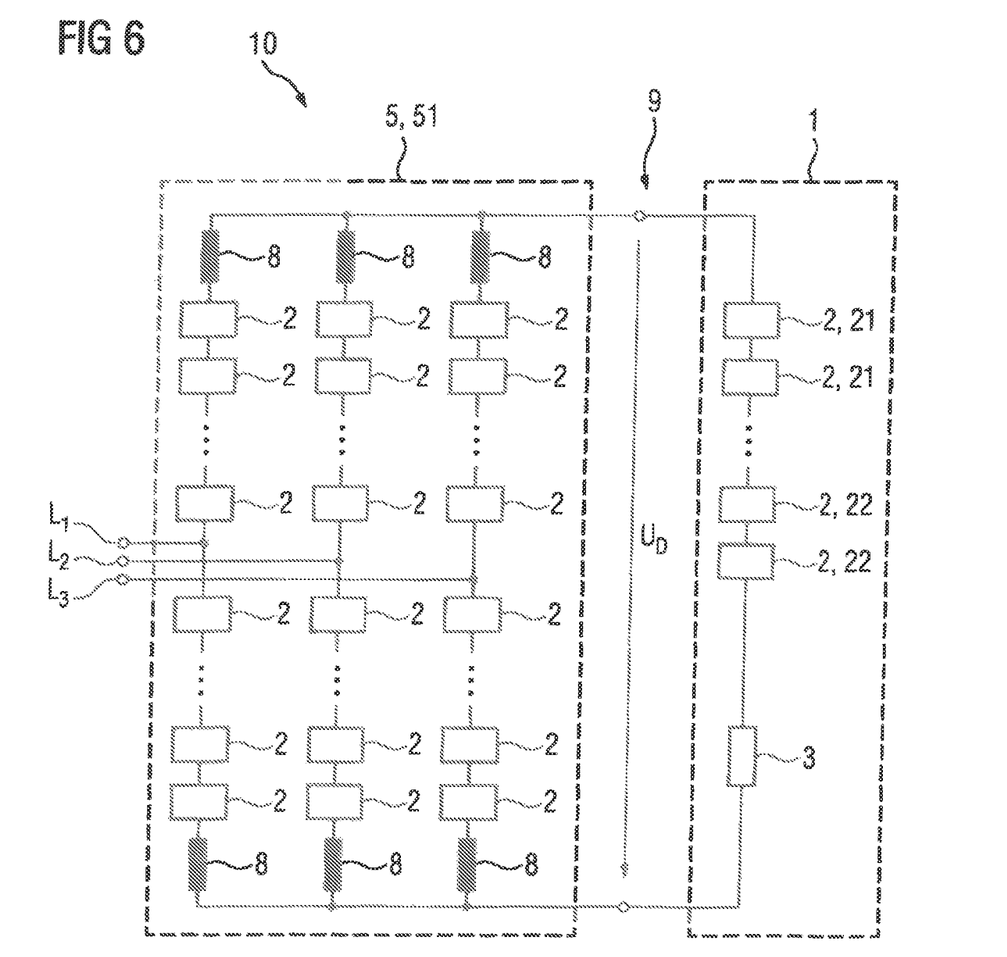

FIG. 6 shows an electric drive 10 in which the power converter 5 is embodied as a modular multilevel power converter 51. The modular braking adjuster 1 and the modular multilevel power converter 51 are connected to one another via the DC link 9 to which the voltage $U_D$ is applied. Herein, the modular multilevel power converter 51 may, but does not necessarily, have as submodules 2 the same submodules 2, i.e., full-bridge modules 21 and/or double half-bridge modules 22, as the modular braking adjuster 1. Moreover, the series circuit of the submodules 2 of the modular multilevel power converter 51 also has an inductance 8, which improves the closed-loop control behavior of the modular multilevel power converter 51. The terminals L1, L2, L3 represent the terminals on the alternating voltage side or, in short, the alternating voltage side of the modular multilevel power converter 51. In this exemplary embodiment, the modular multilevel power converter 51 has a three-phase embodiment. Alternatively, a single-phase embodiment with a neutral conductor or also any number of phases is also possible by providing a corresponding number of phase modules in the modular multilevel power converter 51.

Figure 7:
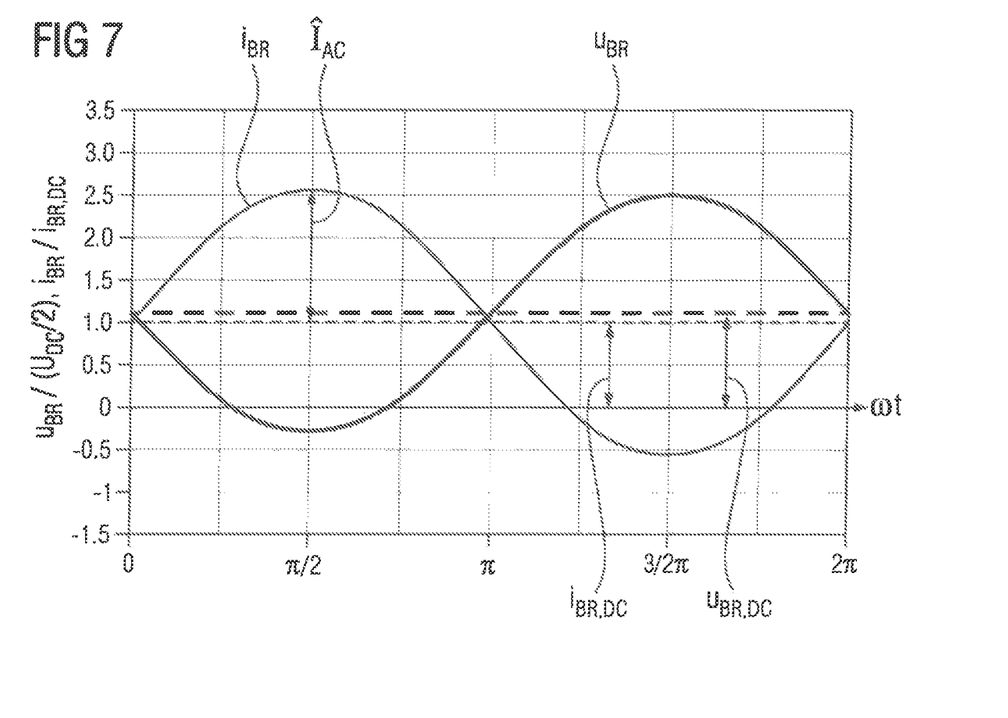
FIG. 7 time curves of electrical variables.

FIG. 7 shows a typical time curve of the voltage $u_{BR}$ across the series circuit of the submodules 2 and the associated current $i_{BR}$ through the modular braking adjuster 1. To avoid repetition, reference is made to the description of FIGS. 1 to 6 and to the reference symbols introduced there. The proposed design can be used with various methods for operating the modular braking adjuster 1. Herein, one possibility is active current and voltage modulation with the modular braking adjuster 1. The submodules 2 can be viewed collectively as a controllable voltage source. In simplified terms, the modular braking adjuster 1 modulates a voltage $u_{BR}$ across the series circuit of the submodules 2 and thus generates a current $i_{BR}$ by the modular braking adjuster 1. Herein, this current $i_{BR}$ has a direct component $i_{BR,DC}$ and an alternating component $i_{BR,AC}$. Herein, the voltage $u_{BR}$ has a direct component $u_{BR,DC}$ and an alternating voltage component $u_{BR,AC}$, which in each case generate the direct component and alternating component in the current through the braking adjuster. It has been shown that the dynamics and the operating range of the braking adjuster can be increased if the voltage $u_{BR}$ applied across the submodules assumes negative values. For this purpose, the voltage $u_{BR}$ is subjected to open-loop or closed-loop control in such a way that the amplitude of the alternating voltage component $U_{BR,AC}$ is greater than the direct voltage component $u_{BR,DC}$. To enable stable operation of the braking adjuster at this operating point, the full-bridge modules are provided in the series circuit. The freely selectable voltage amplitude, even with values above the direct voltage component, enables energy balance of the capacitors of the individual submodules to be ensured. This enables stable operation of the modular braking adjuster with a current through the braking adjuster, wherein this current can assume different polarities. In addition to stable operation, this also ensures high utilization of the operating range of the brake resistor.

The main task of the modular braking adjuster 1 is to convert a defined power into heat over time in the brake resistor 3 or the sum of all braking resistors arranged in series. Herein, the power to be converted into heat is subjected to open-loop or closed-loop control via the direct component $i_{BR,DC}$. To ensure energy balance and stability of the modular braking adjuster 1, the current $i_{BR}$ through the modular braking adjuster has an alternating component $i_{BR,AC}$. The amplitude of the alternating component of the current $i_{BR}$ is designated $\hat{I}_{AC}$.

Negative voltages cannot be generated with unipolar submodules, such as, for example, half-bridge modules or double half-bridge modules 22. The realization of the time curve shown in FIG. 7 with values of the voltage $u_{BR}$ of less than zero therefore requires the use of bipolar submodules, such as, for example, full-bridge modules 21.

Figure 8:
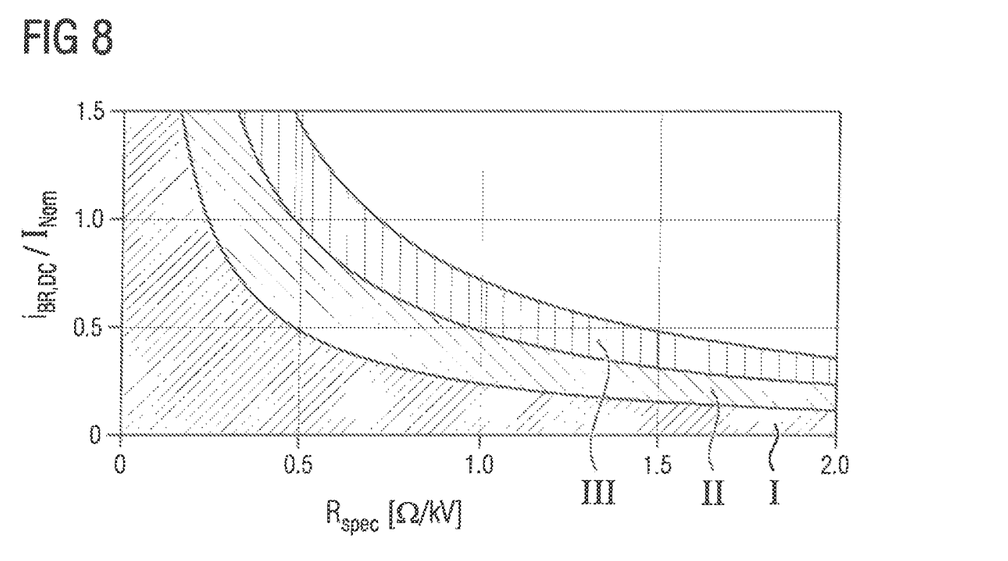
FIG. 8 working areas of the modular braking adjuster.

Operation at higher power increases the proportion of modulated negative voltages across the series circuit of the submodules 2 thus necessitating the use of further full-bridge modules 21. Likewise, the realization of higher power also leads to a reduction in the modulated negative current through the modular braking adjuster. Since unipolar submodules can only provide a positive terminal voltage, the negative component of the current through the modular braking adjuster is required to maintain energy balance. This limits the use of unipolar submodules. The possible operating range of the modular braking adjuster 1 can be described with the aid of the specific resistance $R_{spec}$ and the direct component $i_{BR,DC}$ of the current $i_{BR}$ through the modular braking adjuster. This operating range is depicted in FIG. 8. The specific resistance $R_{spec}$ is the resistance value R relative to the DC link voltage $U_D$, i.e., the operating voltage of the modular braking adjuster 1. For a given system configuration, the direct component $i_{BR,DC}$ of the current $i_{BR}$ through the modular braking adjuster 1 is equivalent to the power converted by the modular braking adjuster 1.

Brake actuator variants that are only equipped with unipolar submodules can only be operated in the hatched operating range designated I. Only in this range is the voltage $U_{BR}$ across the series circuit of the submodules 2 always positive. For example, if the system is equipped with a specific resistance $R_{spec}=0.5$ $\Omega/kV$, a maximum direct component $i_{BR,DC}=0.5$ $I_{Nom}$ can be achieved with this design. Herein, $I_{Nom}$ describes the nominal current of the semiconductor switches used. The proposed modular braking adjuster 1 can likewise be operated in this operating range. If higher powers, i.e., direct components with $i_{BR,DC}>0.5$ $I_{Nom}$, are to be realized, a negative voltage $u_{BR}$ must be generated across the series circuit of the submodules 2. This is identified by the operating range II in which operation of the proposed modular braking adjuster 1 is also possible. Compared to the operating range I with only unipolar submodule types, the proposed modular braking adjuster 1 doubles the performance capability of the proposed modular braking adjuster. The operating range III can only be used with a design that only has full-bridge modules 21. Due to the lower voltage that can be generated by a full-bridge module 21 compared to a double half-bridge module 22, the design of a modular braking adjuster 1 with submodules 2 of the full-bridge module 21 type has proven to be uneconomical. In comparison, the proposed modular braking adjuster 1 offers a significantly cheaper and more economical solution.

Overall, fewer submodules are required for the design of the modular braking adjuster. As can be seen from the curves of the voltage to be generated, a higher proportion of positive voltage than negative voltage must be generated. Compared to the full-bridge module 21, twice the positive output voltage can be achieved with the same amount of material with the double half-bridge modules 22. A further decisive advantage of using a combination of double half-bridge modules 22 and full-bridge modules 21 is the possible mechanical design of these two variants. The same components are required to construct the two submodules for a system. Only the busbar connection for the individual modules between the semiconductors and the submodule capacitors is different. However, they offer the same dimensions, cooling water terminals, electric terminals for the busbar, triggers, etc. For such a system, adapting the design, such as, for example, a cabinet system, and the surrounding peripherals to the specific embodiment of the submodules is unnecessary. Rather, the design or cabinet system contains accommodating devices that are able to accommodate full-bridge modules and double half-bridge modules without any changes. The number and ratio of the installed full-bridge modules 21 and double half-bridge modules 22 can thus be freely varied and scaled in a design.

In summary: the invention relates to a modular braking adjuster 1, having a brake resistor 3 and at least two submodules 2, wherein the brake resistor 3 and the submodules 2 are arranged in a series circuit 4. In order to improve the modular braking adjuster 1, it is proposed that at least one submodule 2 is embodied as a full-bridge module 21 and at least one submodule 2 is embodied as a double half-bridge module 22, wherein the modular braking adjuster 1 has a control device, . . . which is configured to generate a voltage $u_{BR}$ across the submodules 2 arranged in series, wherein the voltage $u_{BR}$ comprises a direct voltage component $u_{BR,DC}$ and an alternating voltage component uBRAC, wherein the control device is further configured to provide open-loop control or closed-loop control of the alternating voltage component $u_{BR,AC}$, in particular in respect of its amplitude, in such a way that the energy taken up by the modular braking adjuster 1 on average over time is converted into heat in the brake resistor 3, wherein the amplitude of the alternating voltage component $u_{BR,AC}$ is, at least temporarily, greater than the direct voltage component $u_{BR,DC}$. The invention further relates to an electric drive 10 having a modular braking adjuster 1 of this kind and a power converter 5, wherein the power converter 5 is electrically connected on the direct voltage side to the modular braking adjuster 1. The invention further relates to a method for operating a modular braking adjuster 1 of this kind or an electric drive 10 of this kind, wherein the submodules 2 generate a voltage $u_{BR}$ of this kind across the submodules 2 arranged in series.

What is claimed is:

1. A modular braking adjuster, comprising:
   a brake resistor and at least two submodules, wherein the brake resistor and the at least two submodules are connected to form a series circuit, wherein at least one submodule is constructed as a full-bridge module and at least one submodule is embodied as a double half-bridge module, and
   a control device configured to
   generate a voltage across the serially connected submodules, with the voltage composed of a direct voltage component and an alternating voltage component,
   to control with the direct voltage component by open-loop control or closed-loop control power to be converted into heat by the modular braking adjuster,
   to control an amplitude of the alternating voltage component by open-loop control or closed-loop control in such a way that the energy taken up by the modular braking adjuster averaged over time is converted into heat in the brake resistor, wherein the amplitude of the alternating voltage component is at least temporarily greater than the direct voltage component, and to at least temporarily generate a negative proportion of the current through the modular braking adjuster for maintaining an energy balance.

2. The modular braking adjuster of claim 1, wherein the alternating voltage component has a periodic curve and an average value of zero.

3. The modular braking adjuster of claim 1, wherein at least one of the at least two submodules has a bypass switch configured to short-circuit terminals of the at least one submodule.

4. The modular braking adjuster of claim 1, wherein all of the at least two submodules have a bypass switch configured to short-circuit terminals of the submodules.

5. An electric drive, comprising:
a modular braking adjuster as set forth in claim 1; and
a power converter electrically connected on a direct voltage side to the modular braking adjuster.

6. The electric drive of claim 5, wherein the power converter is constructed as a modular multilevel power converter.

7. A method for operating an electric drive as set forth in claim 5, the method comprising:
generating with the submodules a voltage across the serially connected submodules, which, at least temporarily, comprise a negative and a positive voltage range, wherein the voltage comprises a direct voltage component providing open-loop or closed-loop control of the power to be converted into heat by the modular braking adjuster and an alternating voltage component, wherein the alternating voltage component is controlled by open-loop control or closed-loop control such that the energy taken up by the modular braking adjuster averaged over time is converted into heat in the brake resistor, wherein an amplitude of the alternating voltage component is at least temporarily greater than the direct voltage component, and
generating at least temporarily with the modular braking adjuster a negative proportion of the current for maintaining an energy balance.

8. The method of claim 7, wherein the alternating voltage component has a periodic curve and an average value of zero.

9. A method for operating a modular braking adjuster as set forth in claim 6, the method comprising:
generating with the submodules a voltage across the serially connected submodules, which, at least temporarily, comprise a negative and a positive voltage range, wherein the voltage comprises a direct voltage component providing open-loop or closed-loop control of the power to be converted into heat by the modular braking adjuster and an alternating voltage component, wherein the alternating voltage component is controlled by open-loop control or closed-loop control such that the energy taken up by the modular braking adjuster averaged over time is converted into heat in the brake resistor, wherein an amplitude of the alternating voltage component is at least temporarily greater than the direct voltage component, and
generating at least temporarily with the modular braking adjuster a negative proportion of the current for maintaining an energy balance.

10. The method of claim 9, wherein the alternating voltage component has a periodic curve and an average value of zero.

* * * * *